W. O. CORNWELL.
ORDER FOR MONEY.
APPLICATION FILED NOV. 16, 1915.

1,177,994. Patented Apr. 4, 1916.

Fig. 1.

Fig. 2.

WITNESSES:
Howard D. Orr.
H. T. Chapman

William O. Cornwell, INVENTOR,
BY
Biggers
Biggers
Attorneys

UNITED STATES PATENT OFFICE.

WILLIAM O. CORNWELL, OF INDIANAPOLIS, INDIANA.

ORDER FOR MONEY.

1,177,994.  Specification of Letters Patent.  Patented Apr. 4, 1916.

Application filed November 16, 1915. Serial No. 61,815.

*To all whom it may concern:*

Be it known that I, WILLIAM O. CORNWELL, a citizen of the United States, residing at Indianapolis, in the county of Marion and State of Indiana, have invented certain new and useful Improvements in Orders for Money, of which the following is a specification.

This invention has reference to improvements in orders for money, and its object is to provide an order with means whereby the raising thereof may be prevented.

In accordance with the present invention the face of the order is provided in addition to the usual printed matter with groups of numerals, each group containing the full number of digits including zero, and there being as many such groups as may be desired, while in addition to the series of groups of digits there is a series of consecutive digits in number corresponding to the number of groups of the first-named digits. With such an arrangement it is possible to mark out in the first-named groups the digits representing the sum for which the order is drawn, while in the second-named series of digits a digit is marked out corresponding to the number of digits included in the amount for which the order is drawn.

The invention is applicable to all checks and drafts, post office and express money orders, etc.

The invention will be best understood from a consideration of the following detailed description, taken in connection with the accompanying drawings forming a part of this specification, with the further understanding that while the drawings show a practical form of the invention, the latter is not confined to any strict conformity to the showing of the drawings, but may be changed and modified so long as such changes and modifications come within the scope of the appended claim.

In the drawings:—Figure 1 is a face view of a bank check with the improvement added, the check being shown in blank. Fig. 2 is a similar view showing the check filled out.

Referring to the drawings there is shown a check 1 which in general may correspond to bank checks as ordinarily printed. Such a check is customarily provided with a place name indicated at 2, a date line 3, a number space 4, the name of the bank as shown at 5, a space 6 for the insertion of the name of the person to whom the check is drawn, other spaces 7 and 8 for the insertion of the amount of the check, and a space 9 for the signature of the person drawing the check. As the check shown may be taken as indicative of any order for money the check will hereinafter be referred to as an order to include bank drafts as well as checks, post office and express money orders, and all other like orders for money. Though such orders may vary in arrangement, they all have the same end in view and the invention is readily applied by suitably rearranging the features making up the invention. At some appropriate point on the order it is customary in connection with the present invention to print a legend 10 and in the present instance this legend reads "This order good for amount drawn."

At an appropriate place on the face of the order, and in the particular instance shown, below the space 8 for writing in the amount of the order, there is provided a series of groups of digits indicated at 11, including groups of digits indicated at 11, including groups of digits one to nine and a zero, and in the numbers one to nine and a zero, and in the particular instance shown these numbers are arranged at random in square spaces 12 inclosed by a border line 13. In the showing of the drawings seven groups are indicated, five being for dollars and two for cents, and are marked, respectively, from ten thousand down to cents, the proper words being placed at the left hand upright side of each group, with the exception that "cents" group consists of two closely associated groups together designated by 11$^a$ instead of 11 as the other or higher groups. It will be understood, however, that as many groups as desired may be provided. Associated with the groups 11$^a$ is a space 14 having therein a row of digits 15 which may, if desired, be printed more prominently than the others, and accompanying these digits are the words "Proof figures", as shown at 16. There are seven groups 11 and 11$^a$ and six digits in the space or row 14, ranging from the digit 2 to the digit 7, and if there be a greater or lesser number of groups 11 and 11$^a$, a corresponding change is made in the digits of the space 14. Of course the proof figures 15 may include the digit 1, but this is usually unnecessary since the group which would be designated by the digit 1 in the proof figures represents less than ten cents and it is not customary to draw checks for such small amounts. Below the space 8 and above the series of groups 11 and 11ª suitable words are printed, as indicated at 17, to instruct the user as to the manner of employing the digits in the groups 11 and 11ª and the proof figures.

In the use of the present invention an order is made out in the usual manner, and in the particular illustration of Fig. 2 it is assumed that the amount for which the check is drawn is sixty-five thousand, four hundred and ninety-two dollars and seventy-three cents. In order to prevent raising of the order, numbers of the different groups 11 and 11ª are punched out or otherwise indicated in such way as to correspond to the amount for which the order is drawn.

In the practical use of the invention, and considering the amount for which the order is drawn as that shown in Fig. 2, the digit 6 of the ten thousands group is punched out, the digit 5 of the thousands group is punched out, the digit 4 in the hundreds column is punched out, the digit 9 in the tens column is punched out, the digit 2 in the units column is punched out, and the digits 7 and 3 in the respective cents columns are punched out. Since the particular amount for which it is assumed the order is drawn included seven columns, the number 7 in the space 14 is punched out. Instead of punching out the numbers in a manner to actually remove the paper of the order, such paper may simply be punched through at the appropriate digits, as by a pencil point or otherwise, or any means may be employed for indicating the number corresponding to the sum for which the order is drawn and the number of groups thus indicated.

The proof figures 15 afford additional protection over the series of groups 11 and 11ª in indicating how many of the groups have been punched, and this becomes particularly valuable where a lesser number of figures is punched out than is represented by the full number of the groups 11 or 11ª. It might be possible where the sum for which the order is drawn is smaller than ten thousand dollars to raise the order even though the groups 11 be properly punched, for if numbers in one, two or three of the groups representing lower amounts be punched there is nothing to prevent the raising of the order to a higher amount and punching a number or numbers out of the higher group or groups. When, however, a number is punched out of the line of proof figures 15 and this number is less than seven in the particular showing of the drawings, it is out of the question to raise the order by the simple expedient of changing the amount in the space 8 up into an amount to include the higher unpunched group or groups 11, and then punching out a corresponding number in the appropriate left hand group or groups 11. The figures 15 therefore becomes proof figures, which in conjunction with the series of groups 11 and 11ª prevent a change in the amount for which the order is originally drawn, for the punched out portions of the groups 11 and 11ª in conjunction with the punched out number in the line of proof figures 15 makes it absolute that the order was originally drawn for no greater amount than the punchings show. As is apparent, the order, if drawn for a small amount, might be raised but for the presence of the proof figures 15, which at once indicates how many of the groups 11 and 11ª initially had figures punched out of them and the figures punched out of such groups 11 make it apparent that the order was originally drawn for a certain amount and no more. If this punched out amount does not agree with the written amount in the space 8, then it appears that the order is invalid.

The number of groups 11 provided on the face of the order may be that which experience shows is ample, while the proof figures 15 contain as many digits in consecutive order as needed to comprehend the groups 11 and 11ª, so that these proof figures show to the receiver of the order that the person drawing it designed to draw the order for no greater amount than that indicated by the punched out portions of the groups 11 and 11ª, and if the sum represented by the punched out portions of the groups 11 and 11ª and the digit punched out in the figures 15 correspond both to the number of digits punched out in the group 11 and 11ª and to the sum stated in the space 8, then the receiver may be sure that the sum there written was the one originally intended.

In the arrangement shown the digits in each group 11 and 11ª are arranged in three horizontal rows of three numbers each with a zero at the bottom of the group. The upper row has the numbers 6, 1, 8; the second row has the numbers 7, 5, 3, and the third row has the numbers 2, 9, 4. The zero is placed below the figure 9 of the lowermost row.

What is claimed is:

An order for money provided with a series of groups of digits with each group representing different values from that of any other group and adapted to have a digit thereof treated to represent a corresponding part of the sum for which the order is drawn, and a series of consecutive digits, other than those in the groups, and in number corresponding to the number of said groups of digits, the series of digits being adapted to have a single one treated to show the total number of groups of digits treated in representing the amount of the order.

In testimony whereof I have affixed my signature in the presence of two witnesses.

WILLIAM O. CORNWELL.

Witnesses:
ELSIE MCDANIEL,
LUEDA MAYER.